June 19, 1928.
M. A. BAKER
1,673,965
APPARATUS FOR FABRICATING STRUCTURAL MEMBERS
Original Filed Oct. 8, 1925   3 Sheets-Sheet 1
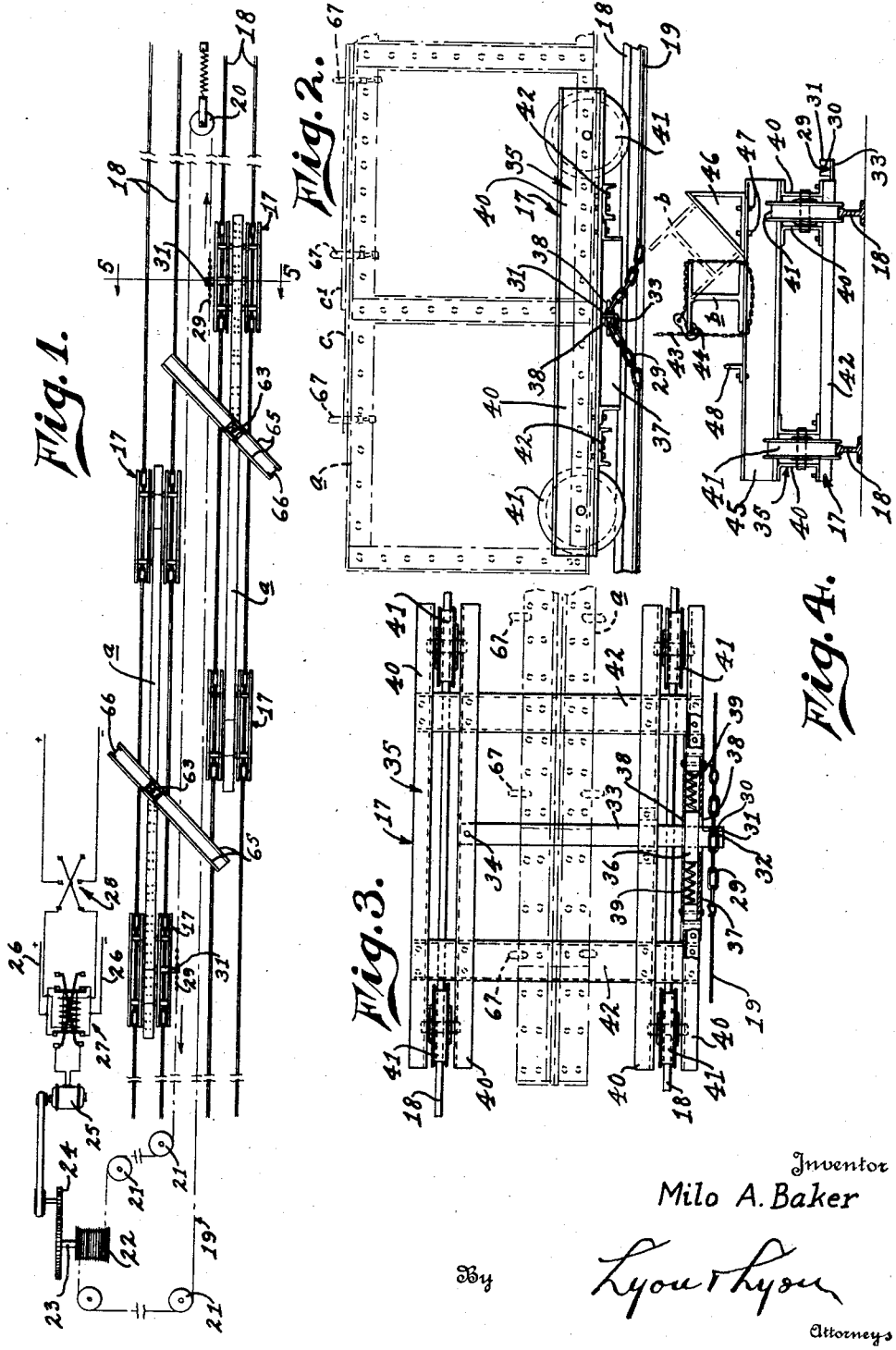
Inventor
Milo A. Baker
By Lyon & Lyon
Attorneys

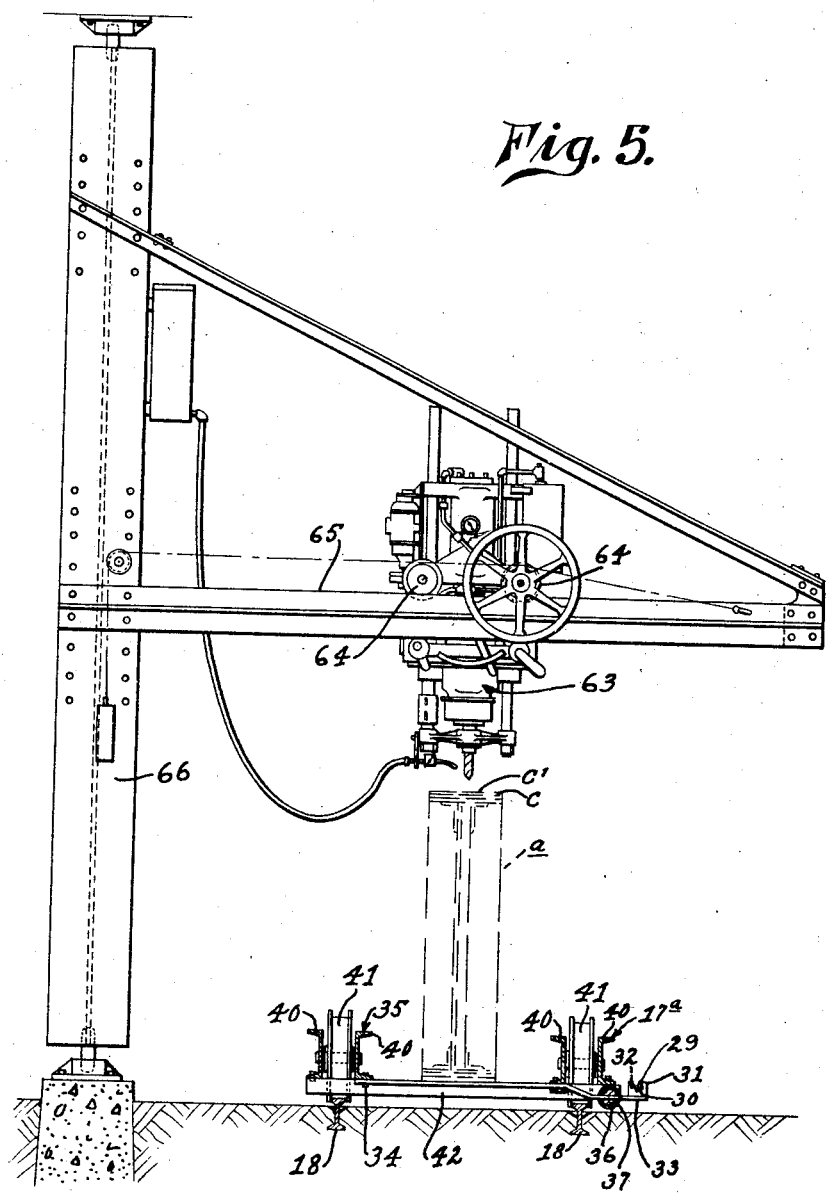

June 19, 1928.  
M. A. BAKER  
1,673,965  
APPARATUS FOR FABRICATING STRUCTURAL MEMBERS  
Original Filed Oct. 8, 1925  3 Sheets-Sheet 3
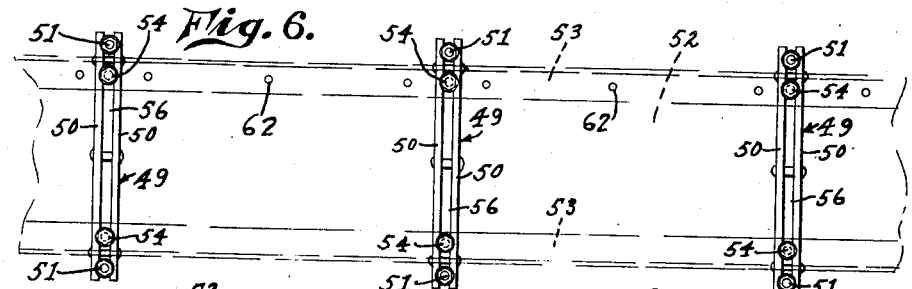
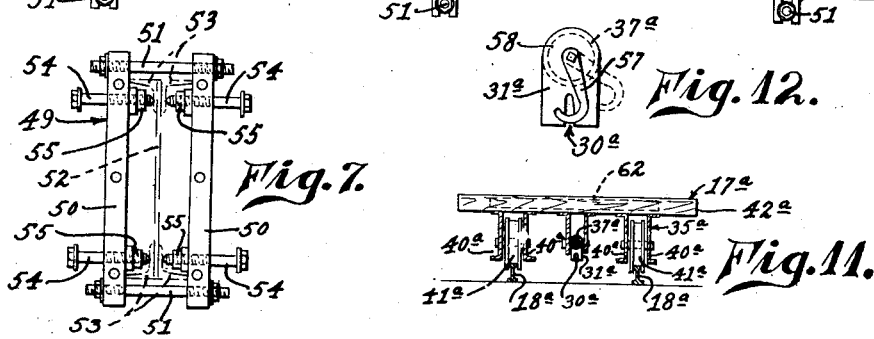
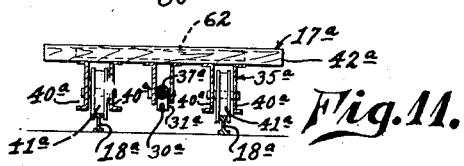
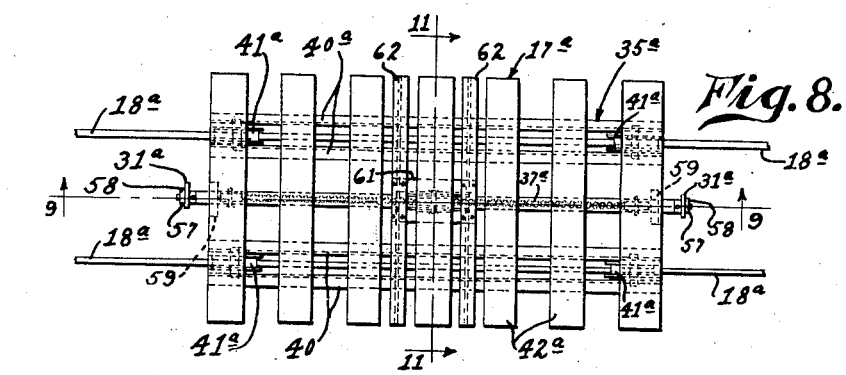
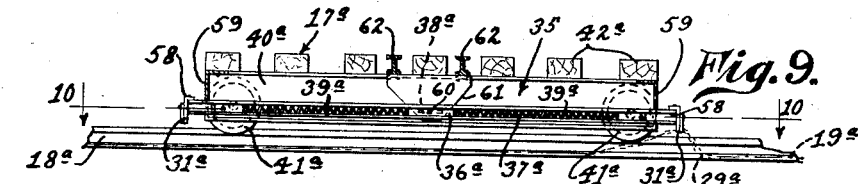
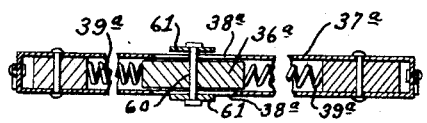
Inventor  
Milo A. Baker  
By Lyon & Lyon  
Attorneys Patented June 19, 1928.

1,673,965

UNITED STATES PATENT OFFICE.

MILO A. BAKER, OF LOS ANGELES, CALIFORNIA.

APPARATUS FOR FABRICATING STRUCTURAL MEMBERS.

Original application filed October 8, 1925, Serial No. 61,204, now Patent No. 1,619,232, dated March 1, 1927. Divided and this application filed December 28, 1926. Serial No. 157,469.

The matter herein described and claimed is divided out of my co-pending application for patent, filed October 8, 1925, Serial No. 61,204, now Patent No. 1,619,232, granted March 1, 1927.

This invention relates to electric drilling apparatus, and especially to the type in which the drill can be readily moved into different positions in a horizontal plane so as to quickly effect the drilling of a number of holes in different parts of the work. This drilling apparatus is especially useful in drilling holes in structural steel or iron elements for receiving the rivets employed in the fabricating of said elements.

This apparatus for fabricating structural members is particularly adapted to the construction of large steel or iron members, such as built-up girders, columns, and other structural units employed in buildings, bridges, etc., in other words, structural members built up of plates and angles, channels, or the like. Such members, by reason of their great size, weight and diversity of form, render impracticable the use of jigs or holders of the type commonly employed for assembling and machining small or medium sized articles, or for quantity production of like parts. By the use of this apparatus I secure greater accuracy and a superior quality of work than that resulting from the methods usually employed for fabricating large structural members.

A very important object attained by the operations performed by this apparatus is the saving effected in the time and labor consumed in laying out the work for riveting and also in the time of actual drilling. By this apparatus a plurality of parts are assembled and clamped together before drilling, thus making it necesssary to lay out the holes, or their location, on only the uppermost member. Not only is a better job secured by employing this apparatus but the work is less costly to produce.

The usual method employed in fabricating structural elements is to drill or punch the holes in the different members separately and, accordingly, the rivets when driven, often do not entirely fill the holes because of the holes being out of alinement, thus permitting a bending strain to come upon the rivets instead of a mere shearing. Rivets are, of course, much stronger in shear than in bending.

An object is to provide for clamping together the structural elements that are to be riveted so that the drilling can be effected and then the riveting accomplished while the elements are still clamped together as they were for drilling.

Another object is to provide a support for the work under electrical control.

Another object is to provide for the absorption of shock in starting and stopping the work support.

Other objects and advantages will appear in the subjoined detailed description.

The accompanying drawings illustrate the invention:

Fig. 1 is a plan view of a drilling apparatus constructed in accordance with the provisions of this invention, the work that is to be drilled being indicated upon the work supports.

Fig. 2 is an enlarged side elevation of one of the work supporting carriages, a girder being shown in broken lines supported on said carriage.

Fig. 3 is a plan view of Fig. 2, partly in section.

Fig. 4 is an end view of one of the carriages with means mounted thereon for aiding in turning of a structural steel element about its longitudinal axis, said element being indicated on the carriage in full and broken lines.

Fig. 5 is a view, partly in section on the line indicated by 5—5, Fig. 1, one of the movably mounted drills being shown in elevation.

Fig. 6 is an edge view showing a number of clamps secured to a plate girder, which is indicated in broken lines.

Fig. 7 is an end elevation of one of the clamps shown in Fig. 6.

Fig. 8 is a plan view of a modified form of carriage for supporting steel plates that are to be drilled.

Fig. 9 is a sectional elevation on the line indicated by 9—9, Fig. 8.

Fig. 10 is an enlarged broken sectional detail on the line indicated by 10—10 Fig. 9.

Fig. 11 is a sectional elevation on the line indicated by 11—11, Fig. 8.

Fig. 12 is an enlarged detail of the latch for coupling the carriage to the operating cable.

The form of the invention illustrated in Figs. 1 to 5 will first be described.

In Fig. 1 a plurality of trucks or carriages 17 is shown, there being, in this instance, two such carriages on each of the tracks 18. The work to be drilled may be supported at its opposite ends on the two carriages on one track.

The carriages are moved to and fro on the tracks by the following described mechanism: An endless cable 19 runs between the tracks and around an idler sheave 20 at one end of the tracks and around other idler sheaves 21 adjacent to the other end of the tracks. Between two of the idler sheaves 21 is a rotatably mounted drum 22 around which a portion of the cable 19 is wound so that turning of the drum will wind the cable at one side and unwind the cable at the other side. The drum shaft 23 is connected by suitable driving gear 24 to a motor 25.

The energizing circuit of the motor 25 is indicated at 26 and said circuit is opened and closed by a magnetic switch 27 controlled by a manually operated switch 28. It is not necessary to describe in detail the magnetic switch 27 and manually operated switch 28, herein, as these are well understood in the art relating thereto, and it suffices to state that the switch 28 may be operated so as to cause rotation of the motor 25 clockwise or counterclockwise to drive the cable 19 in either direction.

Suitable means is provided for releasably coupling the cable 19 to the carriages 17 and, in this instance, said means is constructed as follows: Portions of the cable 19 are formed of chain links 29 and any one of the links is adapted to engage in a vertical slot 30 in a standard or bracket 31 that projects upwardly at one side of the carriage. The slot 30 opens to the upper end of the standard 31.

The links that are at opposite ends of the link that is engaged in the slot 30 form shoulders 32 adapted to engage the standard 31 and thus prevent any appreciable relative movement between the cable and the carriage when the cable is coupled to said carriage.

In this instance, the standard 31 is secured to a movable member 33 pivoted at 34 to the frame 35 of the carriage. Means is provided for yieldingly holding the free end of the member 33 against longitudinal movement relative to the frame 35 and, accordingly, the member 33 passes through a plunger 36 that operates in a cylinder 37, the cylinder having longitudinally extending slots 38 to permit of movement of the member 33 lengthwise of the cylinder. At each end of the plunger 36 is a coil spring 39 within the cylinder, said springs being of equal strength so as to balance the plunger in a midway position in the cylinder, in which position the member 33 is substantially at right angles to the longitudinal axis of the carriage. The cylinder 37 is fixed, being secured in any suitable manner to the underside of the frame 35. When the drum 22 is started into operation to draw the cable 19 in either direction the appropriate spring 39 will yield to absorb the shock that would otherwise be imposed upon the carriage in starting said carriage into motion.

In order to facilitate the drilling of some of the elements of relatively deep girders, each carriage frame 35 comprises longitudinal members 40 which, in this instance, are channel beams arranged in pairs, one pair for each side and the beams of each pair spaced to receive between them a pair of flanged wheels 41. Secured beneath and extending from one of the members 40 to the other are cross channel beams 42 with their webs uppermost. The girder to be operated on, indicated at $a$, rests on the beams 42. This construction of the carriages permits the girders to rest very low on the carriages and also to project as far as desired over the ends of the carriages, thus making it possible to use a shorter track than if the girder were supported in a manner to preclude it projecting beyond both ends of the carriages.

When operating on beams or columns, it is frequently the case that it is desirable to turn the beam or column over upon the carriage between different drilling operations. Especially is it necessary to frequently perform this operation on H-beams, one of which is indicated in different positions in full and in broken lines at $b$ in Fig. 4. In order to effect the turning over of the beams and columns, the flexible member, in this instance a chain 43, of the hoisting tackle is wrapped around the beam $b$, as clearly shown in Fig. 4, and a hook 44 secured to the end of the chain is hooked over the edge of one of the flanges of the beam, in this instance the uppermost flange. Cross members 45, which may be I-beams, are laid on the tops of the channel beams 40 so as to extend from one to the other of said beams, and there is provided near one end of one of the cross members 45 on each of the two carriages a slanting abutment 46 which is releasably secured by bolts 47 to the cross members 45. The abutment 46 is aslant upwardly and outwardly. To turn the beam, the hoisting tackle will be drawn upwardly, thus causing the beam to turn about its longitudinal axis. The presence of the abutments 46 prevents the beam from rolling to the ends of the cross members 45 and off of said members onto the ground. The beam when thus turned, engages the abutments 46 and slides off of said abutments on to the cross members 45. This effects a quarter turn of the beam and the beam may be then turned another quarter of a turn by a similar procedure. Each time the chain 43 is drawn upwardly to rotate the column said column engages and slides down the abutments 46. By the means described the columns can be turned very quickly by a single attendant who simply anchors the chain 43 around the column in the manner indicated in Fig. 4 and then has the chain pulled upwardly by a suitable hoist, not shown.

To the cross members 45 having the abutments 46 there are secured, preferably, abutments 48 which may be formed of angle irons and are spaced from the abutments 46 a sufficient distance to easily admit the beam $b$ between the abutments 46, 48. When the beam $b$ slides off of the abutments 46, which are preferably greased, the abutments 48 limit sliding of the beam $b$ along the cross members 45 away from the abutments 46. When the work is at rest on the beams 42, the cross members 45 will, of course, be removed.

In fabricating the structural steel or iron members by the usual method, the members are marked at the points where the rivet holes are to be made and the holes are then punched or drilled in each member separately. The members that are to be riveted together are then placed with the holes for the rivets approximately in alinement. The alinement is generally inaccurate in which event reaming of the hole is resorted to. The misalinement is frequently so pronounced that the reaming does not cure it. The rivets are then driven in the customary manner.

When the holes in the members are not accurately alined and the rivets are driven, said rivets do not preferably fill the rivet holes. In consequence, the connection is not so strong as it would be if the rivets perfectly filled the holes, because bending of such rivets can occur. Because of this imperfection in fabricating structural steel, the engineer who estimates the strength of the various members that are to form a structure must allow a larger factor of safety than would be necessary if accuracy in the fitting of the rivets in the holes could be depended upon so that said rivets would be only in shear. In order that the riveting may give maximum strength, I propose to clamp the structural members together, to then drill the members while thus clamped together and, finally, to drive the rivets while the members are still clamped together. Suitable clamps for this purpose are indicated, in general, at 49 in Figs. 6 and 7. The clamps are of identical construction and, therefore, only one will be described as follows:

Each clamp 49 comprises spaced clamping members 50 and said members are longer than the width of the members that are to be assembled by riveting. These members 50 are connected together at their opposite ends by bolts 51. In connecting angle irons to a plate, indicated in broken lines in Fig. 7, the clamping members 50 will be placed on opposite sides of the plate 52. Then the angle irons 53 will be placed in position at at the edges of the plate 52 so that the angle irons will be back to back. Then the bolts 51 will be tightened to clamp the members 50 against the edges of the outstanding legs of the angle irons. Screws 54 pass through the members 50 and each is provided adjacent to the inner face of the member 50 with a nut 55. The screws 54 can be shifted longitudinally of the members 50 because of the slots 56 in said members. The screws 54 will be positioned opposite the angle legs that are parallel with the plate 52 and the nuts 55 will be turned to clamp the screw 54 against the angle irons, thus securely clamping the plate 52 between the angle irons. The clamps 49 will be placed at intervals along the member that is being fabricated, as indicated in Fig. 6, and then while the elements that constitute said member are clamped together, holes will be drilled at the designated places, and the rivets are then driven while the elements are still clamped together. After the rivets are driven the clamps will be removed.

Though the drilling of the rivet holes may be effected in any suitable manner while the structural elements are clamped together, I prefer to suspend the drill so that it may be moved freely over the work from one position to another. Referring more especially to Fig. 5, the drill is indicated at 63 and is of any suitable construction, being in this instance an electrically driven drill of well known type. The drill is shiftably mounted, being provided with wheels 64 that run on a track 65. In this instance the track 65 is movably mounted, being in the form of a boom that projects from a pivoting standard 56. This mounting of the drill is described in more detail and is claimed in my copending application for patent filed October 8, 1925, Serial No. 61,205. Said copending application also describes a hydraulic mechanism for raising and lowering of the drill. In Fig. 1 there is a plurality of the drills 63 with their mountings. The booms are pivotally supported on opposite sides of the tracks and each boom can be swung across both tracks, thus enabling both drills to work simultaneously on a single girder or other long structural element.

The apparatus above described operates as follows: Assuming, for example, that the girder $a$ is being provided with cover plates, said cover plates, indicated at $c$, $c^1$, will be temporarily clamped in place, by the use of any suitable clamps 67. The rivet positions will then be marked on the cover plates. The switch 28 will be properly operated to cause the trucks supporting said girder to run along the track to position the girder so that the drill or drills 63 can be brought to bear upon the marked rivet positions that are to be drilled. The drill or drills will then be operated to drill the requisite rivet holes through the cover plates and the structural elements to which the plates are to be fastened. Then, while the cover plates are still clamped, rivets will be driven in the holes thus drilled and, finally, the clamps will be removed. While the girder is under construction, it may be necessary at times to move it along the track so that the drill may be enabled to reach far separated portions of the girder. At such times the switch 28 will be properly operated to move the carriages as desired to obtain this result.

I have shown in Figs. 8 to 12, inclusive, a modified form of carriage or truck for supporting the work that is to be drilled and for moving the work into different positions. The parts that functionally correspond to those described for the carriage 17 will be indicated by the same reference characters with the addition of the letter "a" thus avoiding a repetition of the description of structure that is the same for the carriage 17. This carriage 17ª is more especially designed for supporting plates that are to be drilled. The operating cable 19ª has the chain 29ª and said chain engages a slot 30ª in a bracket or standard 31ª that is secured to one end of a cylinder 37ª. A similar standard may be provided at the other end of the cylinder. The slot 30ª opens to the lower end of the standard 31ª and, in order to prevent the chain 29ª from slipping out of said slot, I have provided a latch 57 in the form of a hook which is pivoted at one end at 58 to the standard 31ª. The latch 57 is adapted to be swung into a vertical position to hook beneath the chain 29ª when the chain is in the slot 30ª. The cylinder 37ª is free to move longitudinally in guides 59 which are secured to the frame 35ª. In the cylinder 37ª is a plunger 36ª which is held stationary by a pin 60 passing through the plunger and fixed at its opposite ends in a bracket 61 formed of a pair of plates that are secured to and project down from cross members 62 of the frame 35ª. Positioned in the cylinder 37ª at each end of the plunger 36ª is a coil spring 39ª. The springs 39ª are of the same strength so as to hold the cylinder 37ª balanced. The operation of this device, when the cable 19ª is pulled in either direction, is the same as previously described for the shock absorber illustrated in Fig. 3, excepting that, in this instance, the cylinder is yieldingly held by the springs against longitudinal movement so that the shock is transmitted by the cable 19ª to the cylinder and thence to either spring 39ª.

In the above description of the operation of the invention, I have included the method of fabricating structural elements, since the elements are first clamped together, the rivet positions marked off on one of the elements, holes drilled through the clamped elements at the marked positions and rivets driven in the holes while the elements remain clamped.

It is to be understood that before the clamps are removed, bolts may be passed through the holes drilled for the rivets and the nuts on said bolts drawn up tight so as to clamp the structural members together, whereupon the special clamps may be removed. Thus, in the appended claims, "clamp" and analogous expressions are to be understood as indicating the use of either the special clamps or the bolts, just mentioned, whereby the structural members are temporarily clamped together while the holes are being drilled and the rivets driven in said holes.

A variation of the above method may be pursued by interpolating, between the operations of clamping the elements and marking off the rivet positions, the operations of tack welding the elements together at different points therealong and unclamping the elements. Such tack welding is indicated at 62 in Fig. 6 and it is to be understood that the term "tack welding" employed herein defines the operation of making a weld of any suitable character at different spots or places whether only the metal of the welded elements constitutes the weld or other metal than that of the elements be used in the weld.

The methods indicated above are not claimed herein but are the subject of my copending application for patent filed October 8, 1925, Serial No. 61,204, now Patent 1,619,232, granted March 1, 1927.

I claim:

1. An apparatus for fabricating structural members comprising a track, a plurality of trucks on the track spaced to support opposite end portions of a structural element, an endless cable, means under the control of an operator to operate the cable in either direction at will, and a means to couple each of the trucks to the cable.

2. An apparatus for fabricating structural members comprising a plurality of trucks having longitudinally extending frame members, wheels supporting said members, a track for the wheels to run on, and cross members secured beneath the longitudinal members to support thereon below the tops of the longitudinal members the end portions of a structural member.

3. An apparatus for fabricating structural members comprising a track, a plurality of trucks on the track spaced to support opposite end portions of a structural element, an endless cable, means under the control of an operator to operate the cable in either direction at will, and a means to yieldingly couple each of the trucks to the cable.

4. An apparatus for fabricating structural members comprising a track, a truck on the track, an endless cable, means under the control of an operator to operate the cable in either direction at will, a cylinder secured to the truck, a plunger in the cylinder, springs in the cylinder at opposite ends of the plunger, a member pivoted to the truck and engaging the plunger, and means connecting the cable to said pivoted member.

5. An apparatus for fabricating structural members comprising a track, a truck on the track, an endless cable, means under the control of an operator to operate the cable in either direction at will, and means connecting the cable to the truck and including opposed springs to absorb shocks from the cable.

6. An apparatus for fabricating structural members comprising a track, a truck on the track provided with a standard having a slot, an endless cable in the slot provided with shoulders on either side of the standard and means under the control of an operator to operate the cable in either direction at will.

7. An apparatus for fabricating structural members comprising a track, trucks on the track, an endless cable, means to couple the cable to each of the trucks, means under the control of an operator to operate the cable in either direction at will, an abutment on each truck having an upwardly and outwardly slanting face, and a second abutment on each truck spaced from the first mentioned abutment sufficiently to permit of turning of a structural element about its longitudinal axis between the first and second mentioned abutments.

8. An apparatus for fabricating structural members comprising a track, trucks on the track, an abutment on each truck having an upwardly and outwardly slanting face, and a second abutment on each truck spaced from the first mentioned abutment sufficient to permit of turning of a structural member about its longitudinal axis between the first and second mentioned abutments.

Signed at Los Angeles, Calif., this 20th day of December, 1926.

MILO A. BAKER.